United States Patent
Sinha et al.

(10) Patent No.: US 10,929,438 B2
(45) Date of Patent: Feb. 23, 2021

(54) IDENTIFYING HIGH VALUE SEGMENTS IN CATEGORICAL DATA

(71) Applicant: Adobe Inc., San Jose, CA (US)

(72) Inventors: Ritwik Sinha, Bangalore (IN); Pranav Ravindra Maneriker, Bengaluru (IN); Dhruv Singal, Bangalore (IN); Atanu R. Sinha, Bangalore (IN)

(73) Assignee: ADOBE INC., San Jose, CA (US)

( * ) Notice: Subject to any disclaimer, the term of this patent is extended or adjusted under 35 U.S.C. 154(b) by 163 days.

(21) Appl. No.: 16/008,601

(22) Filed: Jun. 14, 2018

(65) Prior Publication Data

US 2019/0384853 A1 Dec. 19, 2019

(51) Int. Cl.
G06F 7/00 (2006.01)
G06F 16/28 (2019.01)
G06F 16/25 (2019.01)
G06F 16/2457 (2019.01)

(52) U.S. Cl.
CPC ...... *G06F 16/285* (2019.01); *G06F 16/24578* (2019.01); *G06F 16/252* (2019.01)

(58) Field of Classification Search
CPC .......................... G06F 16/285; G06F 16/24578
USPC ........................................................ 707/737
See application file for complete search history.

(56) References Cited

U.S. PATENT DOCUMENTS

| | | | | |
|---|---|---|---|---|
| 6,058,391 A * | 5/2000 | Gardner | ................ | G06F 16/284 |
| 6,675,164 B2 * | 1/2004 | Kamath | ................ | G06K 9/6282 |
| 8,255,306 B1 * | 8/2012 | Thomson | ................ | G06Q 40/00 |
| | | | | 705/35 |
| 9,684,538 B1 * | 6/2017 | Liu | .................. | G06F 17/16 |
| 10,242,258 B2 * | 3/2019 | Guo | ................ | G06Q 10/06393 |
| 2003/0120785 A1 * | 6/2003 | Young | .................. | H04L 67/306 |
| | | | | 709/228 |
| 2003/0171978 A1 * | 9/2003 | Jenkins | .............. | G06Q 30/0202 |
| | | | | 705/7.31 |
| 2003/0220859 A1 * | 11/2003 | Cohen | .................... | G06Q 40/08 |
| | | | | 705/35 |
| 2012/0124094 A1 * | 5/2012 | Olivieri | ............... | G06F 16/9574 |
| | | | | 707/792 |

(Continued)

OTHER PUBLICATIONS

Zaki M. J., et al., "New algorithms for fast discovery of association rules", tech. rep., Rochester, NY, USA, 1997, pp. 283-286.

(Continued)

*Primary Examiner* — Eliyah S. Harper
(74) *Attorney, Agent, or Firm* — F. Chau & Associates, LLC (57) ABSTRACT

Systems and techniques for identifying segments in categorical data include receiving multiple transaction ID (TID) lists with univariate values that satisfy a thresholding metric with each TID list representing an occurrence of a single attribute in a set of transactions. The TID lists are stored with the univariate values that satisfy the thresholding metric in a data structure. In a loop, candidate itemsets to form from combinations of TID lists are determined using only the combinations of TID lists that satisfy categorical constraints. In the loop, for the candidate itemsets that satisfy categorical constraints, both the thresholding metric and a similarity metric are applied to the candidate itemsets. Final itemsets are formed from only the candidate itemsets that satisfy both the thresholding metric and the similarity metric.

20 Claims, 5 Drawing Sheets

(56) References Cited

U.S. PATENT DOCUMENTS

| | | | |
|---|---|---|---|
| 2016/0283621 A1* | 9/2016 | Yang | G06Q 10/10 |
| 2016/0292163 A1* | 10/2016 | He | G06Q 50/01 |
| 2017/0061296 A1* | 3/2017 | Joshi | G06N 5/04 |
| 2017/0075966 A1* | 3/2017 | Greene | G06F 16/254 |
| 2018/0240149 A1 | 8/2018 | Sinha et al. | |
| 2018/0241764 A1* | 8/2018 | Nadolski | G06N 3/0481 |

OTHER PUBLICATIONS

Agrawal, Rakesh, et al., "Mining association rules be-tween sets of items in large databases", in Proceedings of the 1993 ACM SIGMOD International Conference on Management of Data, SIGMOD '93, (New York, NY, USA), ACM, 1993, pp. 207-216.

Agrawal, Rakesh, et al., "Fast algorithms for mining association rules in large databases", in Proceedings of the 20th International Conference on Very Large Data Bases, VLDB '94, (San Francisco, CA, USA), Morgan Kaufmann Publishers Inc., 1994, pp. 487-499.

Zaki, M. J., et al., "Fast vertical mining using diffsets", in Proceedings of the Ninth ACM SIGKDD International Conference on Knowledge Discovery and Data Mining, KDD '03, (New York, NY, USA), ACM, 2003, pp. 326-335.

Han, Jiawei, et al., "Mining frequent patterns without candidate generation", in Proceedings of the 2000 ACM SIGMOD International Conference on Management of Data, SIGMOD '00, (New York, NY, USA), ACM, 2000, pp. 1-12.

Uno, Takeaki, et al., "Lcm ver.3: Collaboration of array, bitmap and prex tree for frequent itemset mining", in Proceedings of the 1st International Workshop on Open Source Data Mining: Frequent Pattern Mining Implementations, OSDM '05, (New York, NY, USA), ACM, 2005, pp. 77-86.

Srikant, Ramakrishnan, et al., "Mining association rules with item constraints", in Proceedings of the Third International Conference on Knowledge Discovery and Data Mining, KDD'97, AAAI Press, 1997, pp. 67-73.

Borgelt, "Frequent item set mining", Wiley Interdisciplinary Reviews: Data Mining and Knowledge Discovery, vol. 2, No. 6, 2012, pp. 437-456.

Cormode, Graham, et al., "An improved data stream summary: the count-min sketch and its applications", Journal of Algorithms 55.1 (2005): 58-75.

Adobe Experience Cloud, "Analytics Segmentation", retrieved from https://marketing.adobe.com/resources/help/en_US/analytics/segment/seg_overview.html, last updated Apr. 10, 2018, 72 pages.

IBM, "Watson Digital Marketing", retrieved from https://www.ibm.com/think/marketing/a-marketers-guide-to-customer-segmentation/, downloaded on May 31, 2018, 8 pages.

Google, Inc., "About segments—Analytics Help", retrieved from https://support.google.com/analytics/answer/3123951, downloaded on May 31, 2018, 5 pages.

Leskovec, Jure, et al., Mining of Massive Datasets, Chapter 6: Frequent Itemsets, Cambridge University press; 2014, pp. 213-251.

\* cited by examiner

```
         // Define t(I) : Transaction ID list for itemset I
         // Initial call: F ← φ, P ← {({i}, t({i})) : i ∈ I, |({i})| ≥ k}
 1  Function ECLAT-CC (P, k, F)
         Result : F, the set of frequent itemsets
 2       forall (X_a, t(X_a)) ∈ P do
             // X_a is a frequent itemset
 3           F ← F ∪ {X_a, sup(X_a)}
 4           P_a ← φ
             // X_b, X_a comparison in lexicographic order
 5           forall (X_b, t(X_b)) ∈ P, with X_b > X_a do
                 // Generate candidate
 6               X_ab = X_a ∪ X_b
                 // Pre-counting pruning
 7               if CC(X_ab) then
 8                   t(X_ab) = t(X_a) ∩ t(X_b)
 9                   if sup(X_ab) ≥ k then
10                       P_a ← P_a ∪ {(X_ab, t(X_ab))}
11                   end
12               end
13           end
             // Recursive call
14           if P_a ≠ φ then ECLAT-CC (P_a, k, F);
15       end
```

IDENTIFYING HIGH VALUE SEGMENTS IN CATEGORICAL DATA

TECHNICAL FIELD

This description relates to identifying high value segments in categorical data.

BACKGROUND

The capability to segment a large amount of data is important across many different domains. One technique for segmenting data is the discovery of frequent itemsets, also known as frequent itemset mining (FIM) within the data. The problem is often viewed as the discovery of "association rules" and FIM was originally used for the purpose of market-basket analysis. A market-basket model of data is essentially a many-many relationship between two kinds of elements, called "items" and "baskets," but with some assumptions about the shape of the data. The frequent-itemsets problem is that of finding sets of items that appear in (are related to) many of the same baskets. Typically, the market-basket analysis focuses on finding the absolute number of baskets that contain a particular set of items. The results is a count of the co-occurrence of items in transactions.

In addition to market-basket analysis, FIM is now used in almost all settings requiring association rule mining. The data in a database includes attributes with each attribute capable of having one or more values. The frequent itemset mining problem is to find all itemsets (i.e., attribute value combinations) in the database with support more than a given threshold. In this manner, the data is segmented into the most frequently occurring itemsets, which also may be referred to as segmentation. The categorical nature of these attributes and that each attribute can take many possible values present an explosion in attribute combinations from which to form segments. Moreover, and importantly, any segment needs to be vetted for its value. In addition to segmentation, another problem is to identify which of those most frequently occurring itemsets may be of high value (or of most significant interest) based on additional criteria or metrics. Thus, from data in a database, a technical problem to overcome is to efficiently find combinations of attribute values, which effectively comprise high value segments.

The data to be segmented may come from different domains in different contexts. For example, in one context the data may be related audience members or users of a particular website domain (e.g., website traffic). It may be desirable to efficiently find combinations of attribute values related to the website traffic and its audience members and, importantly, which of those combinations comprise high value segments based on specific metrics relative to the audience members.

In this context, there are many characteristics used for defining segments: demographic, psychographic, behavioral, among others. While some characteristics are continuous variables (e.g., income, age), others are categorical (e.g., race). In the context of website traffic, audience members can arrive from a wide variety of sources to a website. Web traffic is characterized by digital attributes such as country, type of browser, type of operating system (OS), language, as well as other attributes. With information on demographics and psychographics often lacking on incoming digital traffic, segmentation tends to heavily rely on these digital attributes. For example, {Browser="Chrome", Country="USA", OS="Windows"} could be a segment. The categorical nature of these attributes and that each attribute can take many possible values (e.g., number of countries) present an explosion in attribute combinations from which to form segments. Moreover, and importantly, any segment in this context needs to be vetted for its value. Value metrics in this context may include number of orders, revenue, visitors who are more likely to place an order, as well as other metrics.

In any context, including the example web traffic context described above, three criteria need to be satisfied for successful segmentation and identification of high value segments: (i) finding segments efficiently from the combinatorial explosion presented by the attributes (in the case above the digital attributes related to web traffic), (ii) finding segments of high value using desired metrics with thresholds, and (iii) finding segments that are distinct from one another.

Current systems and techniques take two broad forms. In the first form, existing FIM algorithms first find segments in (i), and then for the formed segments try to satisfy (ii). This method does not meet (ii) since value metrics are not germane to or aligned with digital attributes, nor meets (iii) because itemsets may comprise mostly of a lower order itemset (for example, the segment {Chrome, USA} may comprise mostly of members in segment {Chrome, USA, Windows}).

In the second form, algorithms first find segments according to (ii) and then try to define those formed segments in terms of digital attributes. In this second form, it becomes difficult to satisfy (i) and yet meet the distinctiveness criterion of (iii). Moreover, the sequential nature of the algorithms in the implementation of these two forms of existing systems and techniques brings about inefficiency along with ineffectiveness already described.

Furthermore, other approaches, including classical supervised learning approaches such as classification or regression that are used for segmentation, have drawbacks as well. For instance, these approaches are not geared to handle a large number of high cardinality categorical attributes that characterize certain data such as web traffic data. Other alternatives such as a decision tree may fail for various reasons. First, a decision tree searches through the space of all possible segment definitions in a greedy fashion, thus missing out on potentially interesting high dimensional segments. Second, a decision tree may generate "Not" rules (e.g., Browser !="Chrome"), which are less interpretable. Finally, another method uses Count Min-Sketch, an approach to generate probabilistic estimates from streams of data; however, this is an approximate method (with probabilistic guarantees) and is primarily designed for data streams and not geared towards data that has been archived for a period of time.

Commercial products that may implement the existing systems and techniques fall short and are not able to perform segmentation of data that considers both value metrics and attribute values at the same time. Moreover, these commercial products do not provide support for detecting and preventing reporting of similar segments.

SUMMARY

According to one general aspect, systems and techniques for identifying segments in categorical data include receiving multiple transaction ID (TID) lists with univariate values that satisfy a thresholding metric with each TID list representing an occurrence of a single attribute in a set of transactions. The TID lists are stored with the univariate values that satisfy the thresholding metric in a data structure.

In a loop, candidate itemsets to form from combinations of TID lists are determined using only the combinations of TID lists that satisfy categorical constraints. In the loop, for the candidate itemsets that satisfy categorical constraints, both the thresholding metric and a similarity metric are applied to the candidate itemsets. Final itemsets are formed from only the candidate itemsets that satisfy both the thresholding metric and the similarity metric.

The details of one or more implementations are set forth in the accompanying drawings and the description below. Other features will be apparent from the description and drawings, and from the claims.

DETAILED DESCRIPTION

The system and techniques described in this document provide technical solutions to the technical problems described above to identify high value segments in categorical data. The system and techniques provide a technical solution that simultaneously addresses the criteria mentioned above for successful segmentation and identification of high value segments: (i) finding segments efficiently from the combinatorial explosion presented by the attributes (in the case above the digital attributes related to web traffic), (ii) finding segments of high value using desired metrics with thresholds, and (iii) finding segments that are distinct from one another. The technical solution includes segmentation of data into high value segments by considering three criteria simultaneously: frequent itemset mining, thresholding on metrics and dissimilarity among segments.

More specifically, the system and techniques address the three criteria by using a FIM algorithm, which considers all possible attribute combinations, that applies categorical constraints to speed up the FIM algorithm. At the same time, the FIM algorithm also applies a thresholding metric and a similarity metric to identify appropriate and distinct segments during the segment generation process itself. The simultaneous approach of applying categorical constraints, a thresholding metric and a similarity metric results in improved computer performance in identifying the desired segments from a large amount of data compared to other existing approaches described above that are more sequential in approach.

The categorical constraints are applied at the time of candidate set generation, before the counting stage, which results in lower running time for the algorithm, which translates to better computing efficiency because of less processing time. Traditionally, it is known that frequent itemset generation is computationally expensive. The application of the categorical constraints at the time of candidate set generation reduces the computational expense of the frequent itemset generation.

In addition, the thresholding metric and the similarity metric are applied at the time of candidate set generation, before the counting stage, which also results in lower running time for the algorithm. For both the thresholding metric and the similarity metric, any anti-monotone variable (e.g., count, total revenue, number or orders, number of purchases, etc.) may be used to determine which attribute value combinations to discard. The attribute value combinations may be discarded (or eliminated) from processing either by putting a threshold using the thresholding metric and/or by identifying similar itemsets using the similarity metric. The use of any anti-monotone variable on which to base the thresholding metric and the similarity metric allows for more flexibility in selecting more attributes on which to build and identify desired segments. The simultaneous application of the categorical constraints, the thresholding metric and the similarity metric results in more effective segmentation as well as in promoting efficiency through faster computing resource execution time and more efficient use of computing resources such as memory.

Optionally, the resulting segments may be filtered through the application of a filtering metric. Itemsets that do not satisfy the filtering metric may be removed from the results and from any further consideration or processing. As an additional option, the filtered segments may be ranked through the application of a ranking metric. For example, the filtering of the segment and the ranking of the filtered segments may be achieved by applying one or more aggregate and/or average metric values. For instance, in the context of website traffic the aggregate and/or average metric values may include a number of repeat visitors or average duration of time spent by a visitor.

As used herein, a transaction ID (TID) list refers to any list related to a transaction and having a transaction identifier and includes one attribute having one univariate value. The TID list may be stored as a data structure in a database. For example, data related to traffic to a website may include one million audience members. Each audience member has different attributes and each attribute may have different values. One TID list for this data may be a list of audience members that originated from the United States. Thus, the TID list includes a transaction ID for each member having the country attribute with a value of United States. Another TID list may include a list of audience member that originated from India. Thus, each TID list may include one attribute and one value for the attribute (i.e., one attribute value), where the TID list represents each transaction, identifiable by an identifier, that included that attribute with that attribute value.

As used herein, a thresholding metric refers to a minimum boundary value. In some implementations, the thresholding metric is applied to a list and/or as part of an algorithm. Any anti-monotone variable (e.g., count, total revenue, number of orders, etc.) may be used as the thresholding metric. In some implementations, the thresholding metric refers to a minimum count value, which is one of the anti-monotone variables that may be used.

As used herein, candidate itemsets refers to a listing of transactions (or instances) that each has one or more attribute values (or item values) from different attributes. Candidate itemsets also may be referred to interchangeably as segments.

As used herein, categorical constraint refers to an encoded constraint applied to itemsets based on the notion that any candidate itemset which has two more attribute values from the same attribute cannot have a non-zero count.

As used herein, a similarity metric refers to a value that quantifies the similarity between two objects. In the context of this document, the similarity metric refers to a value that quantifies the similarity between two itemsets. Any anti-monotone variable (e.g., count, total revenue, number of orders, etc.) may be used as the similarity metric. In some implementations, the similarity metric may be expressed as a count of an itemset with the threshold being that an pair of itemsets should not cover more than a certain percentage (%) of common items.

As used herein, a filtering metric refers to any value that expresses a criteria, such as, for example, an aggregate or average metric value, that is applied to a list to refine the list and eliminate items from the list that do not meet the criteria.

As used herein, a ranking metric refers to any value that expresses a criteria, such as, for example, an aggregate or average metric, that is applied to a list to order the list according to the criteria.

Figure 1:
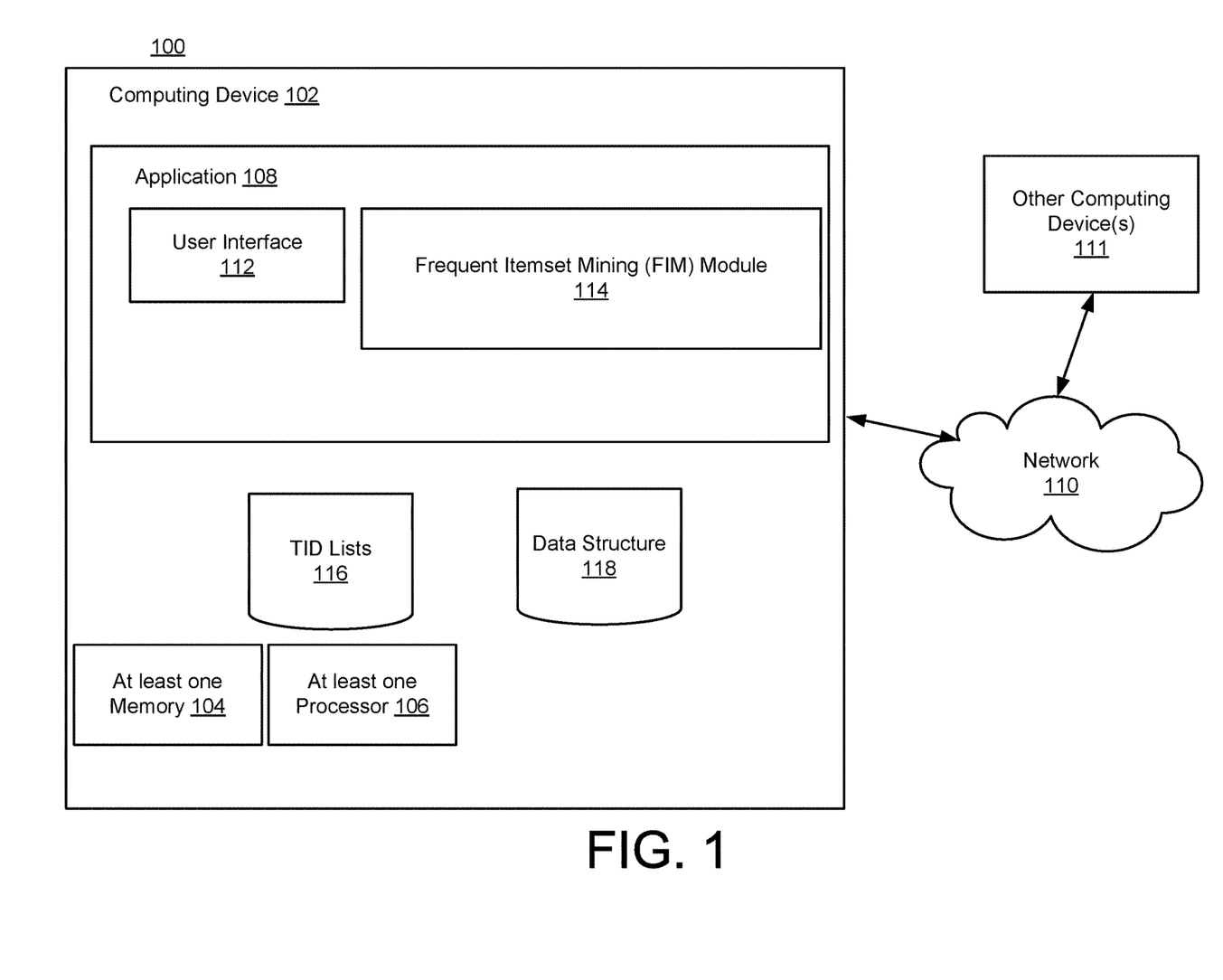
FIG. 1 is a block diagram of a system for identifying high value segments in categorical data.

Referring to FIG. 1, an example block diagram illustrates a system 100 for identifying high value segments in categorical data. The system 100 includes a computing device 102 having at least one memory 104, at least one processor 106 and at least one application 108. The computing device 102 may communicate with one or more other computing devices such as computing device(s) 111 over a network 110. The computing device 111 includes components of a typical computing device including a display (not shown) and other components such as a memory (not shown) and a processor (not shown).

In some implementations, the application 108 on computing device 102 receives input (e.g., transaction ID (TID) lists) from the computing device 111 over the network 110. The application 108 implements one or more components, as discussed in more detail below, to receive the input, process the input and generate an output. The output may include a data structure, a listing or other display of segments in categorical data. The output of the data structure may be visualized on the display of the computing device 111.

While in some implementations of FIG. 1, the input is received from the computing device 111 and the output is provided to the computing device 111, in other implementations, the input may be received from other computing devices including being directly input into the computing device 102. For example, the input may include the TID lists 116. The TID lists 116 may be stored on the local computing device 102 and may be used as input to the application 108. Also, the output also may be displayed and/or stored on the computing device 102. The output from the application 108 may include the data structure 118, which may be configured to visualization and display on a display (not shown) of the computing device 102.

The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network, such as the network 112.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the models generated by the application 108 and its components.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102 and/or by a user of the computing device 111 accessing the application 108 over the network 110. In some implementations, the application 108 is implemented as data management platform (DMP) that is used to build unique audience profiles to enable users to identify valuable segments and use them across any digital channel.

The application 108 includes a user interface 112 and a frequent itemset mining (FIM) module 114. The application 108 and the FIM module 114 use a FIM algorithm, which considers all possible attribute combinations, that applies categorical constraints to speed up the FIM algorithm. At the same time, the FIM algorithm also applies a thresholding metric and a similarity metric to identify appropriate and distinct segments during the segment generation process itself. The simultaneous approach of applying categorical constraints, a thresholding metric and a similarity metric results in improved computer performance in identifying the desired segments from a large amount of data compared to other existing approaches described above that are more sequential in approach.

The FIM module 114 applies the categorical constraints at the time of candidate set generation, before the counting stage, which results in lower running time for the algorithm, which translates to better computing efficiency because of less processing time. Traditionally, it is known that frequent itemset generation is computationally expensive. The application of the categorical constraints at the time of candidate set generation reduces the computational expense of the frequent itemset generation.

In addition, the FIM module 114 applies the thresholding metric and the similarity metric at the time of candidate set generation, before the counting stage, which also results in lower running time for the algorithm. For both the thresholding metric and the similarity metric, any anti-monotone variable (e.g., count, total revenue, number or orders, number of purchases, etc.) may be used to determine which attribute value combinations to discard. The attribute value combinations may be discarded (or eliminated) from processing either by putting a threshold using the thresholding metric and/or by identifying similar itemsets using the similarity metric. The use of any anti-monotone variable on which to base the thresholding metric and the similarity metric allows for more flexibility in selecting more attributes on which to build and identify desired segments. The simultaneous application of the categorical constraints, the thresholding metric and the similarity metric results in more effective segmentation as well as in promoting efficiency through faster computing resource execution time and more efficient use of computing resources such as memory.

Optionally, the FIM module 114 may filter the resulting segments through the application of a filtering metric. Itemsets that do not satisfy the filtering metric may be removed from the results and from any further consideration or processing. As an additional option, the FIM module 114 may rank the filtered segments through the application of a ranking metric. For example, the filtering of the segment and the ranking of the filtered segments may be achieved by applying one or more aggregate and/or average metric values. For instance, in the context of website traffic the aggregate and/or average metric values may include a number of repeat visitors or average duration of time spent by a visitor.

In operation to find targeted itemsets, the FIM module 114 receives TID lists 116 with univariate values that satisfy a thresholding metric. Each TID list represents an occurrence of a single attribute in a set of transactions. As used herein, a transaction ID (TID) list 116 is any list related to a transaction and having a transaction identifier and includes one attribute having one univariate value. The TID list 116 may be stored as a data structure in a database. For example, data related to traffic to a website may include one million audience members. Each audience member has different attributes and each attribute may have different values. One TID list for this data may be a list of audience members that originated from the United States. Thus, the TID list includes a transaction ID for each member having the country attribute with a value of United States. Another TID list may include a list of audience member that originated from India. Thus, each TID list may include one attribute and one value for the attribute (i.e., one attribute value), where the TID list represents each transaction, identifiable by an identifier, that included that attribute with that attribute value.

The TID lists 116 with the univariate values that satisfy a thresholding metric are stored in a data structure 118. As used herein, a thresholding metric is a minimum boundary value. In some implementations, the thresholding metric is applied to a list, such as the TID lists 116, and/or as part of an algorithm. Any anti-monotone variable (e.g., count, total revenue, number of orders, etc.) may be used as the thresholding metric. Here, as applied to the TID lists 116, the thresholding metric is a count value. The TID lists 116 that satisfy the count value, meaning the number of transactions on the list meets and/or exceeds the count value, is stored in the data structure 118 and is further processed by the FIM module 114. In some implementations, the thresholding metric may be set to include a percentage (%) of the total number of items. The thresholding metric value and the count of each TID list may be stored in the data structure 118, including storing that information in a lookup table.

To start finding candidate itemsets, the FIM module 114 determines candidate itemsets to form from combinations of TID lists using only the combinations of TID lists that satisfy categorical constraints. The FIM module 114 determines the candidate itemsets to form using an iterative loop. As used herein, candidate itemsets refers to a listing of transactions (or instances) that each has one or more attribute values (or item values) from different attributes. Candidate itemsets also may be referred to interchangeably as segments. As used herein, categorical constraint refers to an encoded constraint applied to itemsets based on the notion that any candidate itemset which has two more attribute values from the same attribute cannot have a non-zero count.

Said another way, the FIM module 114 considers all combinations of TID lists 116 to form candidate itemsets, subject to categorical constraints. Thus, by imposing categorical constraints, the FIM module 114 is more efficient and faster at finding candidate itemsets because itemsets that do not satisfy the categorical constraints are not considered and do not use any processing power as the FIM module 114 performs the process in the iterative loop. The FIM module 114 discards itemsets that do not satisfy the categorical constraints. In this manner, these itemsets that do not satisfy the categorical constraints are pruned.

For example, categorical constraints precludes the consideration of combinations that cannot possibly occur. For instance, if the overall transactions relate to web traffic and the attribute is country of origination, then it would not be possible to have an itemset with values from more than one country. For instance, the origination of web traffic from a particular user cannot be both from the United States and India. Thus, the application of categorical constraints eliminates from consideration such combinations of itemsets that cannot both occur.

For the candidate itemsets that satisfy categorical constraints, the FIM module 114 applies both the thresholding metric and a similarity metric to the candidate itemsets. As used herein, a similarity metric refers to a value that quantifies the similarity between two objects. In the context of this document, the similarity metric refers to a value that quantifies the similarity between two itemsets. Any anti-monotone variable (e.g., count, total revenue, number of orders, etc.) may be used as the similarity metric. In some implementations, the similarity metric may be expressed as a count of an itemset with the threshold being that an pair of itemsets should not cover more than a certain percentage (%) of common items. The FIM module 114 applies both metrics to the candidate itemsets that satisfy categorical constraints in an iterative loop.

In this manner, during the generation process, the FIM module 114 applies the thresholding metric, which may be a count value that is the same value or a different value than was applied previously by the FIM module 114 to remove TID lists that did not meet the thresholding metric. In some implementations, the thresholding metric may be expressed as a percentage that gets converted to an absolute value. The absolute value may then be used to check a count value in the candidate itemsets. Those candidate itemsets that do not meet the count value are pruned are removed from any further consideration.

The FIM module 114 also simultaneously applies the similarity metric to the candidate itemsets. For a candidate itemset to receive further consideration, the candidate itemset must satisfy both the thresholding metric and the similarity metric. While generating the final itemsets from the candidate itemsets, the similarity metric is used to check the overlap in the value of the similarity metric as compared to newly generated itemsets. For example, the similarity metric may be a percentage of the count of the itemset relative to the count of the other itemset. If this percentage is above the similarity metric percentage, the itemsets are too similar to be of interest and the one itemset is eliminated from any further consideration or processing. Efficiency is gained by not processing the newly generated itemsets and its descendants.

Following the application of the thresholding metric and the similarity metric in a loop, the FIM module 114 forms final itemsets from only the candidate itemsets that satisfy both the thresholding metric and the similarity metric. The output of the final itemsets may be stored in the data structure 118. That is, in some implementations, the data structure 118 that contained the original TID lists that satisfied categorical constraints may be updated to reflect the final itemsets generated by the FIM module 114. The FIM module 114 also may generate one or more visualizations of the final itemsets for display on the user interface 112 of the application 108.

Optionally, the FIM module 114 can filter the final itemsets to generate filtered final itemsets by applying a filtering metric. As used herein, a filtering metric refers to any value that expresses a criteria, such as, for example, an aggregate or average metric value, that is applied to a list to refine the list and eliminate items from the list that do not meet the criteria. The filtering metric may be used to assist in identifying high value segments from the final itemsets that have been generated by the FIM module 114. For instance, the FIM module 114 may iterate through the final itemsets and calculate a filtering metric value for each of the final itemsets and then compare that value to a set filtering metric value. For instance, in the web traffic context, the filtering metric may be an average number of repeat visitors. Any final itemset which does not satisfy the set filtering metric value (or threshold for the filtering metric) is removed from further consideration. The final itemset that do satisfy the filtering metric value are the filtered final itemsets.

Optionally, the FIM module 114 can rank the final itemsets or the filtered final itemsets to generate ranked final itemsets or ranked filtered final itemsets, respectively, by applying a ranking metric. As used herein, a ranking metric refers to any value that expresses a criteria, such as, for example, an aggregate or average metric, that is applied to a list to order the list according to the criteria. The ranking metric may be used to assist in identifying high value segments from either the final itemsets or the filtered final itemsets that have been generated by the FIM module 114. For instance, the FIM module 114 may iterate through the final itemsets or the filtered final itemsets and calculate a ranking metric value for each of the itemsets and then order the itemsets based on the itemsets with the highest value being ordered at the top. For example, in the web traffic context, the ranking metric may be an average time spent by a customer on the website.

The ranked final itemsets or the ranked filtered final itemsets may be stored in the data structure 118. The FIM module 114 may provide a visualization of the ranked final itemsets or the ranked filtered final itemsets on the user interface 112 of the application 108.

In some implementations, it is possible that the filtering metric and the ranking metric are the same metric.

Figure 2:
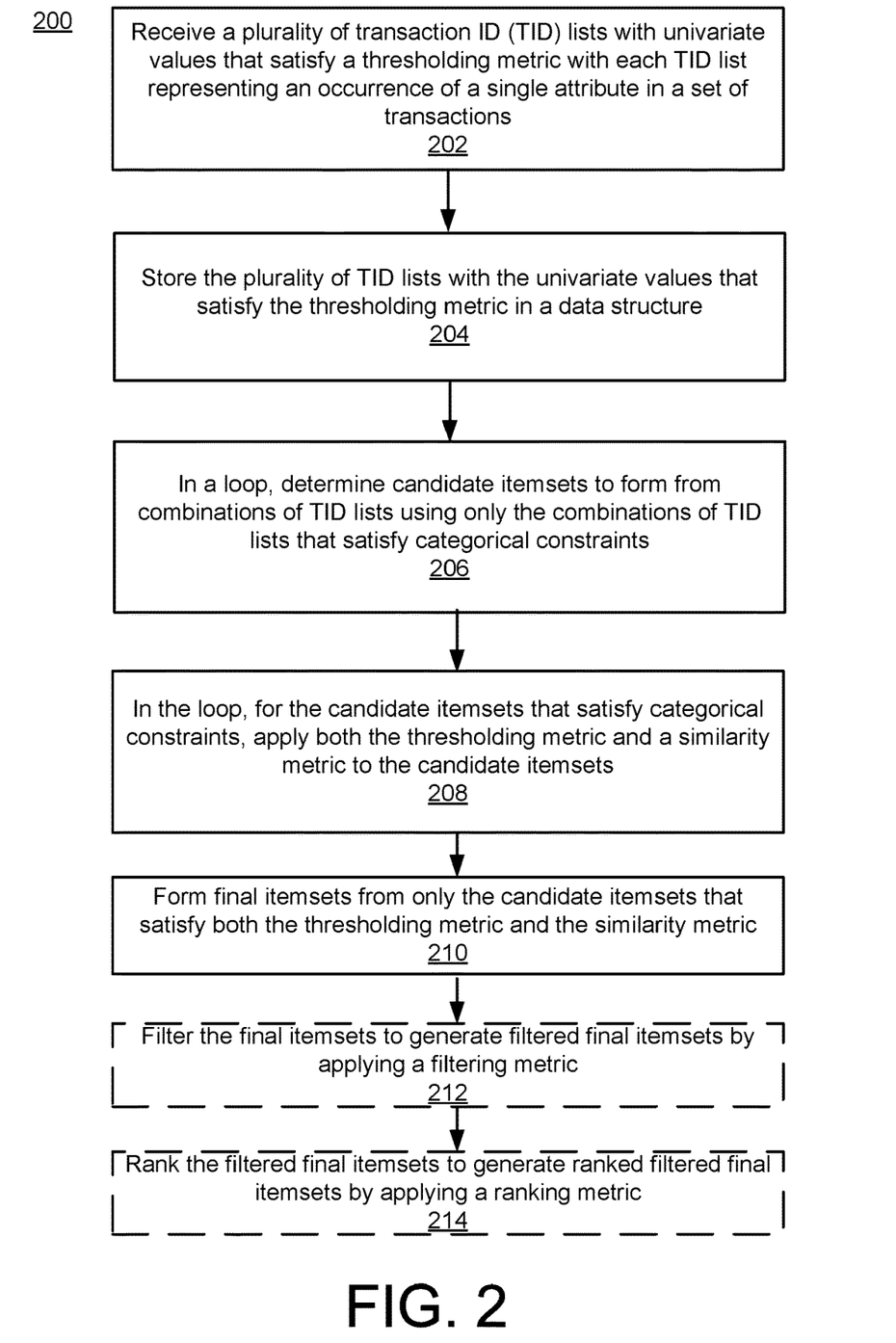
FIG. 2 is a flowchart illustrating example operations of the system of FIG. 1.

Referring to FIG. 2, an example process 200 illustrates example operations of the system 100 of FIG. 1. Process 200 includes a computer-implemented method for identifying segments in categorical data. Process 200 includes receiving multiple TID lists with univariate values that satisfy a thresholding metric with each TID list representing an occurrence of a single attribute in a set of transactions (202). For example, as discussed above, the FIM module 114 receives multiple TID lists 116 with univariate values that satisfy a thresholding metric with each TID list representing an occurrence of a single attribute in a set of transactions.

Process 200 includes storing the TID lists with the univariate values that satisfy the thresholding metric in a data structure (204). For example, as discussed above, the FIM module 114 stores the TID lists with the univariate values that satisfy the thresholding metric in the data structure 118. Process 200 may further include storing one or more anti-monotone variables associated with the thresholding metric with the TID lists in the data structure. For example, the FIM module 114 may store the one or more anti-monotone variables associated with the thresholding metric with the TID lists in the data structure 118.

Process 200 includes, in a loop, determining candidate itemsets to form from combinations of TID lists using only the combinations of TID lists that satisfy categorical constraints (206). For example, as discussed above, the FIM module 114 iterates in a loop to determine candidate itemsets to form from combinations of TID lists using only the combinations of TID lists that satisfy categorical constraints. Process 200 may further include discarding the candidate itemsets that fail to satisfy categorical constraints. For instance, the FIM module 114 may discard the candidate itemsets that fail to satisfy categorical constraints.

Process 200 includes, in the loop, for the candidate itemsets that satisfy categorical constraints, applying both the thresholding metric and a similarity metric to the candidate itemsets (208). For example, as discussed above, the FIM module 114 iterates in the loop for the candidate itemsets that satisfy categorical constraints and applies both the thresholding metric and a similarity metric to the candidate itemsets.

Process 200 includes forming the final itemsets from only the candidate itemsets that satisfy both the thresholding metric and the similarity metric (210). For example, as discussed above, the FIM module 114 forms the final itemsets from only the candidate itemsets that satisfy both the thresholding metric and the similarity metric. Process 200 may include updating the data structure with the final itemsets. For example, the FIM module 114 may update the data structure 118 with the final itemsets.

Optionally, process 200 includes filtering the final itemsets to generate filtered final itemsets by applying a filtering metric (212). For example, as discussed above, the FIM module 114 filters the final itemsets to generate filtered final itemsets by applying a filtering metric.

Optionally, process 200 includes ranking the filtered itemsets to generate ranked filtered final itemsets by applying a ranking metric (214). For example, as discussed above, the FIM module 114 ranks the filtered itemsets to generate ranked filtered final itemsets by applying a ranking metric.

Figure 3:
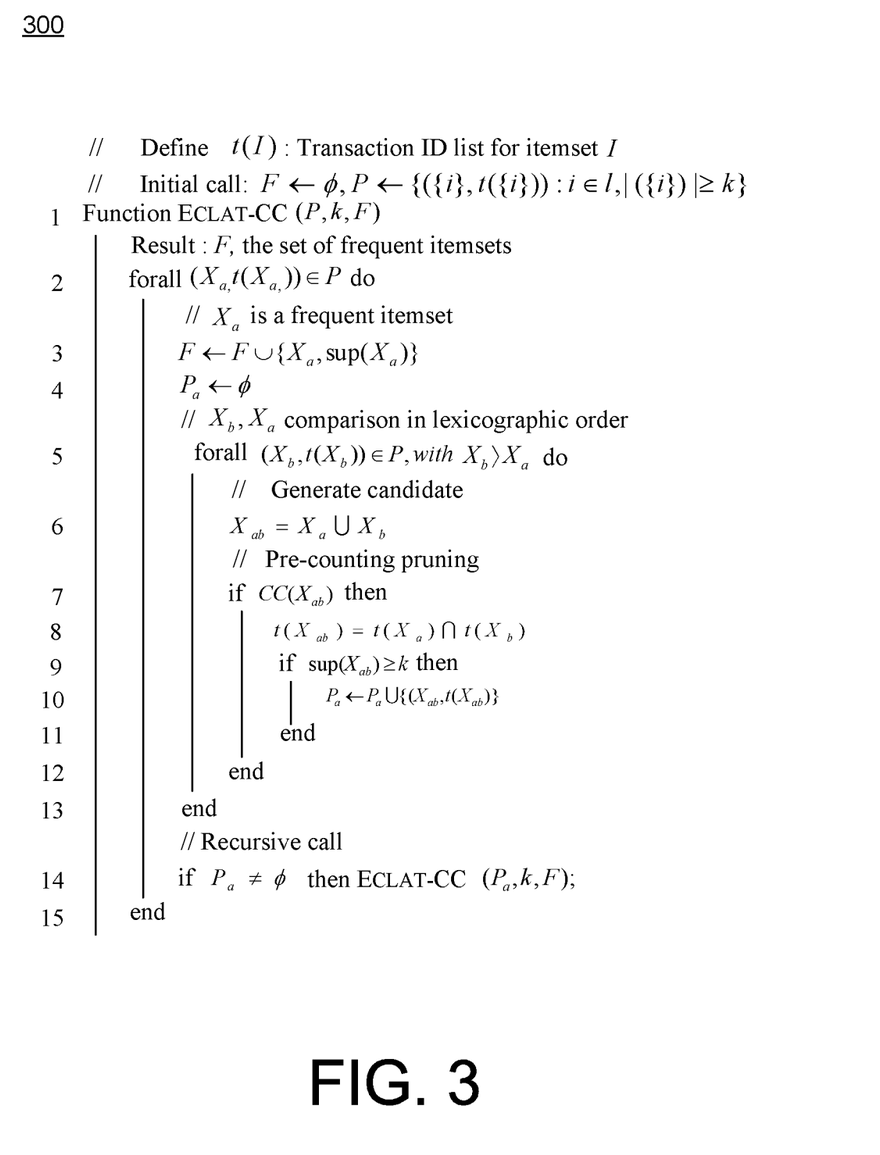
FIG. 3 is example pseudo-code for an algorithm for identifying segments in categorical data using the system of FIG. 1.

Referring to FIG. 3, example pseudo-code illustrates an example algorithm 300 for identifying segments in categorical data using the system 100 of FIG. 1. This example algorithm 300 is based on Eclat with modifications to add categorical constraints, along with a thresholding metric and a similarity metric. The algorithm 300 may be referred to in the algorithm (and elsewhere) as Eclat-CC, meaning Eclat with categorical constraints. Algorithm 300 is a pseudo-code equivalent of the process 200 of FIG. 2.

To add in categorical constraints in Eclat, pre-counting pruning is adding in line 7 of the algorithm 300. That is, the categorical constraints can be pushed to the stage post the candidate generation phase and prior to support related checks. Candidates which do not satisfy the constraint can be discarded. For Eclat, the check is pushed to the stage prior to taking intersections of transaction lists of generated candidates.

For illustrative purposes, the following specifications for the metric constraints are assumed:
   Thresholding metric (T metric)—Count of a segment, with the threshold % at t % of the total number of customers.
   Similarity metric (S metric)—Count of a segment, with the threshold being that any pair of segments should not cover more than s % (of the bigger segment) common customers.

Filtering metric (F metric)—Average number of repeat visitors in a segment, with an absolute threshold of f Ranking metric (R metric)—Average time spent by the customers in a segment For all these metrics, the metric values are tracked and the counts of each itemsets at each level of algorithm 300. This can be done by augmenting the data structure 118 used in maintaining the TID lists, by adding the metric values for each transaction in a lookup table.

For the T metric constraint, the threshold of t % is converted into an absolute value. The absolute value is then used to check the count during the counting pruning step (Line 9) in algorithm 300. Any other metric like total revenue, total number of orders, etc. can be used for pruning.

For the S metric constraint, while generating the candidate itemsets (Line 6) in algorithm 300, the overlap in the value of the S metric is checked in the newly generated itemset. For example, it can be checked at the step when the categorical constraint is checked. Since the metric is anti-monotone, the metric value for the newly generated itemset will always be less than or equal to the itemset being processed. Hence, it suffices to check the similarity between the metric values for the new itemset and the current itemset, to satisfy the similarity threshold. For this example, the percentage of the count of the bigger itemset accounted by the new itemset is checked. If this percentage is above s %, the itemsets are too similar to be of interest. Efficiency is gained by not processing the newly generated itemsets and its descendants.

After the constrained Eclat-CC algorithm 300 outputs some segments, these segments are iterated through and their F metric value (i.e. average number of repeat visitors) is calculated. Any segment which does not satisfy the threshold of f % is removed from further consideration.

For the remaining segments, the segments are ranked by their R metric value (i.e. average time spent by the customers). The result is the final output of the high value segments.

Figure 4:
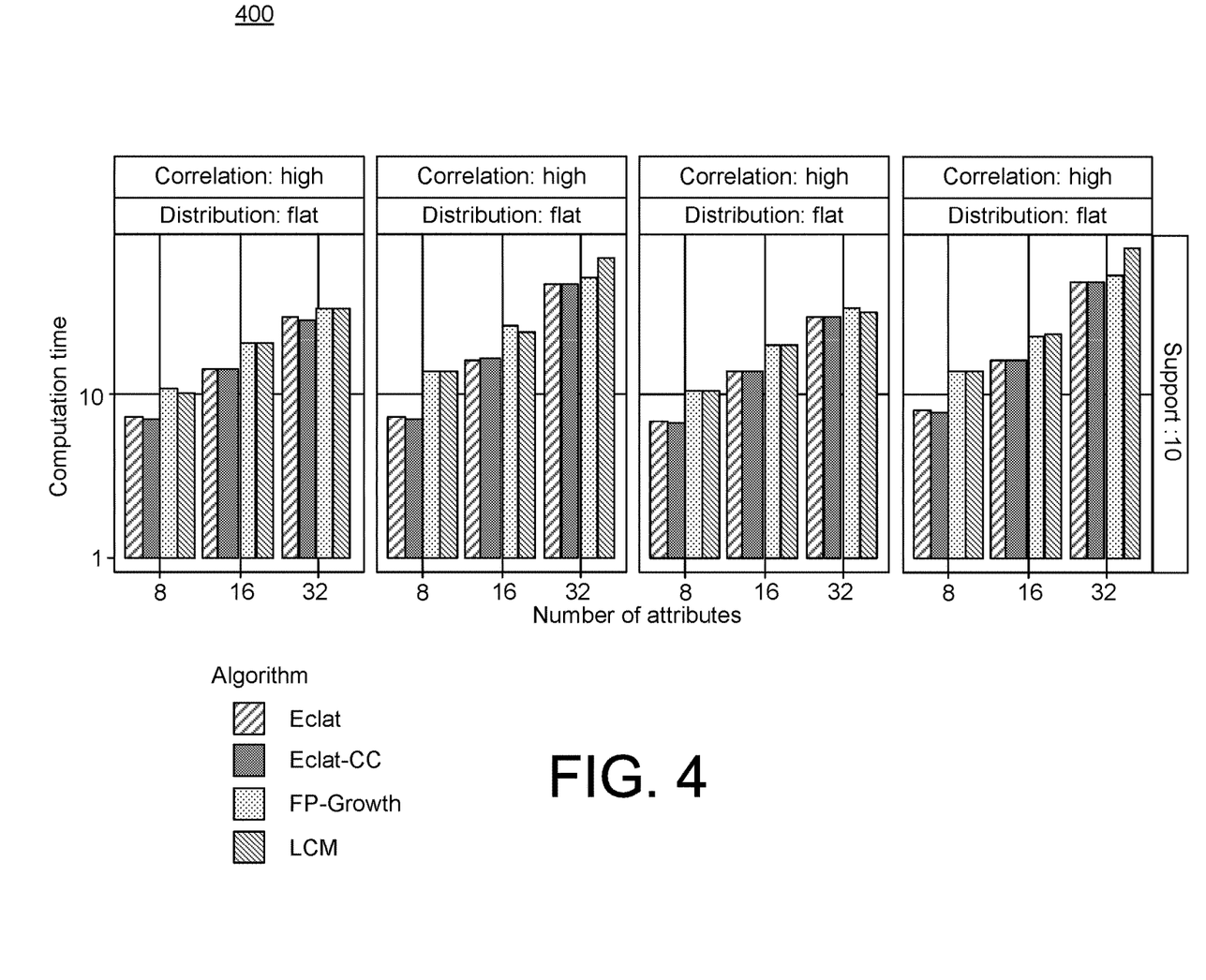
FIG. 4 is an example chart of results of experimental data after processing through different frequent itemset mining algorithms including the algorithm of FIG. 3.

For stress testing of the categorical constraints approach, a set of experiments with baseline algorithms are run on simulated data through the algorithm 300 as compared to other algorithms such as Eclat, FP-Growth and LCM. To generate this data, tuples with categorical attributes are created. The correlation between different categories in each tuple follows a distribution similar to that of the real data. Each dataset contains 10 million entries. The size of each tuple (i.e., the number of attributes) is varied between 8, 16 and 32 and compare the run times of the algorithms at a 10% support threshold. The results are shown in FIG. 4 in the chart 400.

The chart 400 illustrates that the algorithm 300 of FIG. 3 (the Eclat-CC algorithm) is consistently either the fastest or as fast as the best performing algorithm across all cases. The comparison time on the y-axis is illustrated in seconds. To test scalability, simulated data with 200 million entries has been tested with the algorithm 300 producing answers within minutes.

In another experiment, two datasets of real-world data is considered and processed through the algorithm 300. The first dataset is a page views dataset (PVD) and the second dataset is a bid request dataset (BRD). PVD has 48 million hits, with 10 attributes per hit, whereas BRD has 86 million hits. Each row of the datasets comprises of attributes such as OS, browser, country and some attributes specific to each dataset. Table 1 below shows the running time comparison of the different frequent itemset mining (FIM) approaches.

Here too, the algorithm 300, Eclat-CC, consistently outperforms the other approaches, lending further support to its robustness.

TABLE 1

FIM variant comparison on actual data (running time in seconds)

| Dataset | Support | Eclat | Eclat-CC | FP-Growth | LCM |
|---|---|---|---|---|---|
| PVD | 10% | 41.9 | 42.1 | 59.9 | 59.1 |
| BRD | 10% | 73.7 | 73.0 | 135.8 | 137.6 |

In another example illustration of the final output from the algorithm 300, visitor level data from a website was used. The attributes (with the distinct number of values) and target variables (with their value range) in this data are listed in Table 2 and Table 3, respectively.

TABLE 2

Attribute Values

| Attribute | Distinct Values |
|---|---|
| browser | 483 |
| country | 182 |
| domain | 60301 |
| geo_country | 203 |
| geo_city | 12756 |
| geo_region | 856 |
| j_jscript | 4 |
| language | 116 |
| mobile_id | 2849 |
| os | 171 |
| resolution | 228 |
| post_search_engine | 187 |
| visit_ref_domain | 1032 |
| visit_ref_type | 7 |
| visit_start_pagename | 2580 |

TABLE 3

Target Variable

| Variable | Observed Values |
|---|---|
| duration | 1 to 86375 |
| repeat | 0/1 |
| count | 1 |

The data spans the duration of one day in December 2016. There are a total of 696876 visitors in this duration. We chose the following parameters for running in algorithm 300 to identify high value segments:

T metric: t %=40% (total count of a segment should be greater than 40% of the total database).

S metric: s %=90% (total count of a segment should be greater than 90% of the parent segment).

F metric: f %=50% (average number of repeat visitors in a segment should be greater than 50%).

R metric: average duration spent by the customers in the segment.

Figure 5:
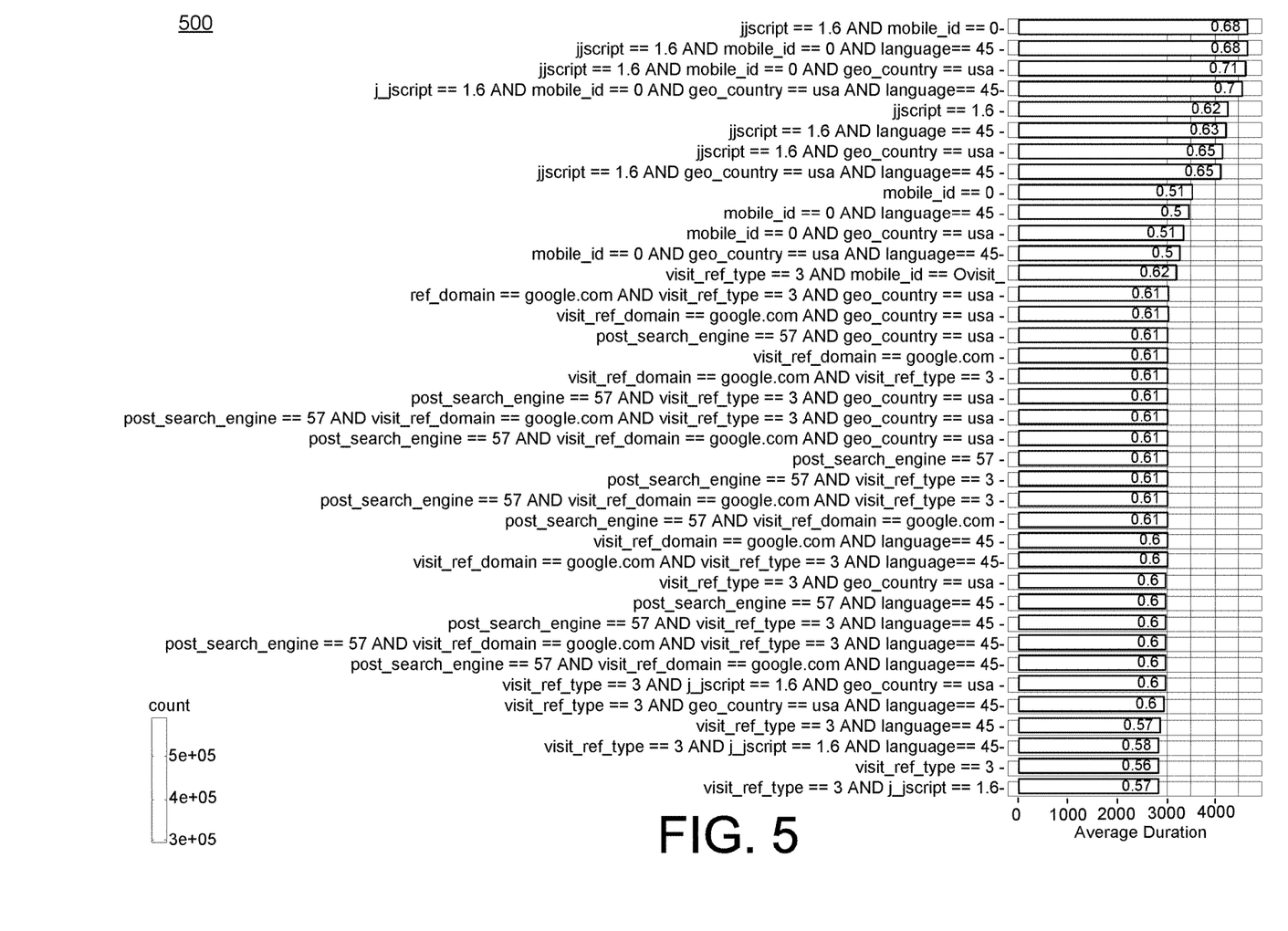
FIG. 5 is an example chart of results of real-world data after processing through the algorithm of FIG. 3.

When the data is run through algorithm 300, 38 high value segments are identified. These segments are illustrated in the chart 500 of FIG. 5. The shading of the bars indicates the count (size) of the segment (the T and S metric). The number at the end of each bar indicates the average number of orders in the segment (F metric) and the length of the bar indicates the average duration spent by customers in the segment (R metric).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identifying segments in categorical data, the method comprising:
   applying a thresholding metric to a plurality of transaction ID (TID) lists with univariate values, wherein each TID list represents an occurrence of a single attribute in a set of transactions and at least some of the univariate values comprise categorical attributes;
   initializing a set of frequent itemsets as the plurality of TID lists with the univariate values that satisfy the thresholding metric;
   in a loop, determining candidate itemsets to add to the set of frequent itemsets by taking unions of two itemsets in the set of frequent itemsets;
   determining whether each of the candidate itemsets satisfies categorical constraints, wherein the categorical constraints preclude combinations of itemsets that cannot occur based on the categorical attributes;
   applying both the thresholding metric and a similarity metric to the candidate itemsets only to candidate itemsets that satisfy the categorical constraints; and
   adding the candidate itemsets that satisfy the categorical constraints, the thresholding metric and the similarity metric to the set of frequent itemsets to form final itemsets.

2. The method as in claim 1, further comprising filtering the final itemsets to generate filtered final itemsets by applying a filtering metric.

3. The method as in claim 1, further comprising ranking the final itemsets to generate ranked final itemsets by applying a ranking metric.

4. The method as in claim 1, further comprising:
   filtering the final itemsets to generate filtered final itemsets by applying a filtering metric;
   and ranking the filtered final itemsets to generate ranked filtered final itemsets by applying a ranking metric.

5. The method as in claim 1, further comprising discarding the candidate itemsets that fail to satisfy categorical constraints.

6. The method as in claim 1, further comprising storing one or more antimonotone variables associated with the thresholding metric with the plurality of TID lists in the data structure.

7. The method as in claim 1, further comprising updating the data structure with the final itemsets.

8. A system for identifying segments in categorical data, the system comprising:
   at least one memory including instructions; and
   at least one processor that is operably coupled to the at least one memory and that is arranged and configured to execute instructions that, when executed, cause the at least one processor to implement a frequent itemset mining (FIM) module that is configured to:
   apply a thresholding metric to a plurality of transaction ID (TID) lists with univariate values, wherein each TID list represents an occurrence of a single attribute in a set of transactions and at least some of the univariate values comprise categorical attributes;

initializing a set of frequent itemsets as the plurality of TID lists with the univariate values that satisfy the thresholding metric;

in a loop, determining candidate itemset to add to the set of frequent itemsets by taking unions of two itemsets in the set of frequent itemsets;

determining whether each of the candidate itemsets satisfies categorical constraints, wherein the categorical constraints preclude combinations of itemsets that cannot occur based on the categorical attributes;

apply both the thresholding metric and a similarity metric to the candidate itemsets only to candidate itemsets that satisfy the categorical constraints; and adding the candidate itemsets that satisfy the categorical constraints, the thresholding metric and the similarity metric to the set of frequent itemsets to form final itemsets.

9. The system of claim 8, wherein the FIM module is further configured to filter the final item sets to generate filtered final itemsets by applying a filtering metric.

10. The system of claim 8, wherein the FIM module is further configured to rank the final itemsets to generate ranked final itemsets by applying a ranking metric.

11. The system of claim 8, wherein the FIM module is further configured to:
filter the final itemsets to generate filtered final itemsets by applying a filtering metric;
and rank the filtered final itemsets to generate ranked filtered final itemsets by applying a ranking metric.

12. The system of claim 8, wherein the FIM module is further configured to discard the candidate itemsets that fail to satisfy categorical constraints.

13. The system of claim 8, wherein the FIM module is further configured to store one or more anti-monotone variables associated with the thresholding metric with the plurality of TID lists in the data structure.

14. The system of claim 8, wherein the FIM module is further configured to update the data structure with the final itemsets.

15. A computer program product for identifying segments in categorical data, the computer program product being tangibly embodied on a non-transitory computer-readable storage medium and comprising instructions that, when executed by at least one computing device, are configured to cause the at least one computing device to:

apply a thresholding metric to a plurality of transaction ID (TID) lists with univariate values, wherein each TID list represents an occurrence of a single attribute in a set of transactions and at least some of the univariate values comprise categorical attributes;

initializing a set of frequent itemsets as the plurality of TID lists with the univariate values that satisfy the thresholding metric;

in a loop, determining candidate itemset to add to the set of frequent itemsets by taking unions of two itemsets in the set of frequent itemsets;

determining whether each of the candidate itemsets satisfies categorical constraints, wherein the categorical constraints preclude combinations of itemsets that cannot occur based on the categorical attributes;

apply both the thresholding metric and a similarity metric to the candidate itemsets only to candidate itemsets that satisfy the categorical constraints; and adding the candidate itemsets that satisfy the categorical constraints, the thresholding metric and the similarity metric to the set of frequent itemsets to form final itemsets.

16. The computer program product of claim 15, further comprising instructions that, when executed, cause the computing device to filter the final itemsets to generate filtered final itemsets by applying a filtering metric.

17. The computer program product of claim 15, further comprising instructions that, when executed, cause the computing device to rank the final itemsets to generate ranked final itemsets by applying a ranking metric.

18. The computer program product of claim 15, further comprising instructions that, when executed, cause the computing device to:
filter the final item sets to generate filtered final itemsets by applying a filtering metric;
and rank the filtered final itemsets to generate ranked filtered final itemsets by applying a ranking metric.

19. The computer program product of claim 15, further comprising instructions that, when executed, cause the computing device to discard the candidate itemsets that fail to satisfy categorical constraints.

20. The computer program product of claim 15, further comprising instructions that, when executed, cause the computing device to update the data structure with the final itemsets.

\* \* \* \* \*